June 16, 1942.  F. D. JOESTING  2,286,282
CONTROL APPARATUS
Filed July 3, 1939  2 Sheets-Sheet 1
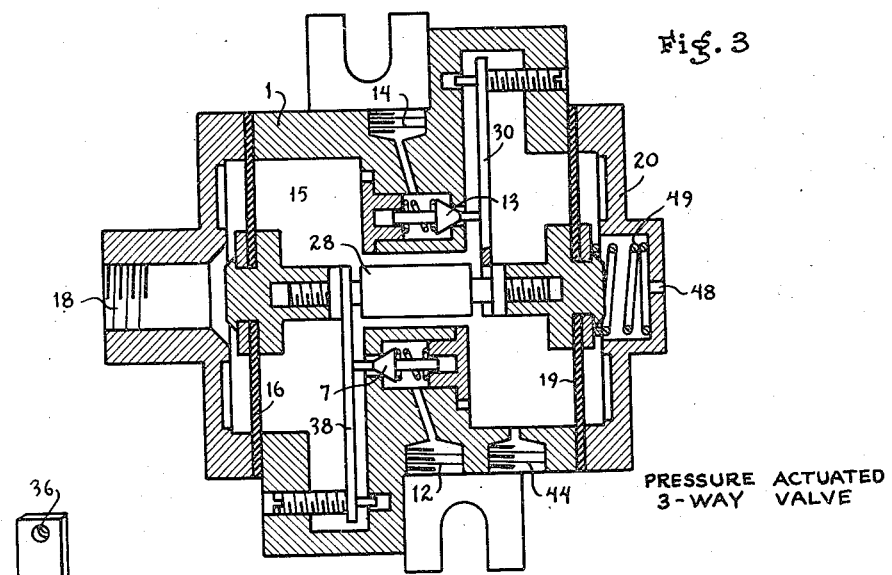
PRESSURE ACTUATED 3-WAY VALVE
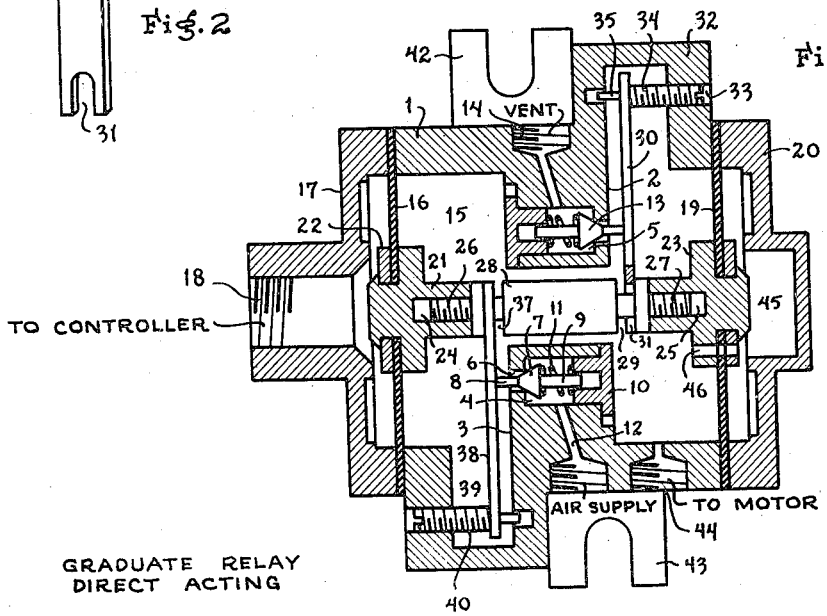
GRADUATE RELAY DIRECT ACTING
Inventor
Frederick D. Joesting
By George H. Fisher
Attorney

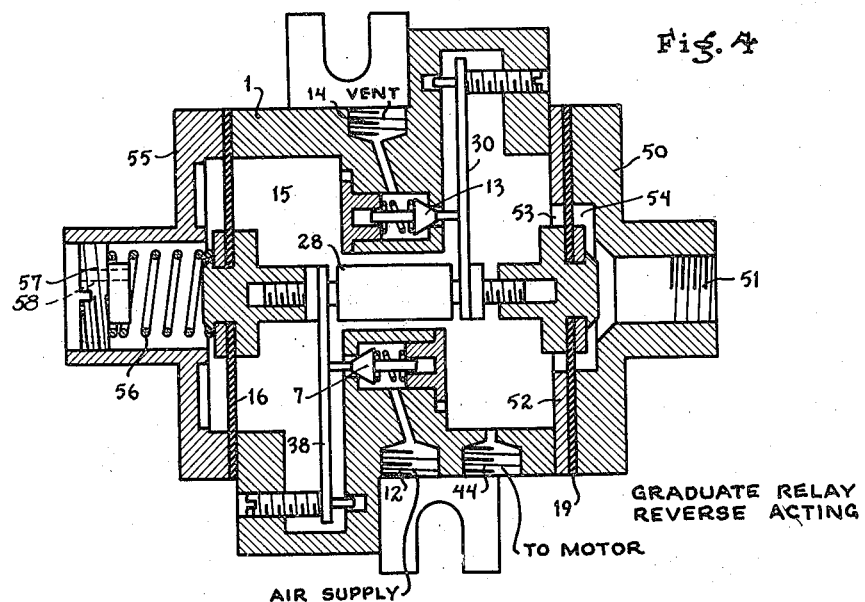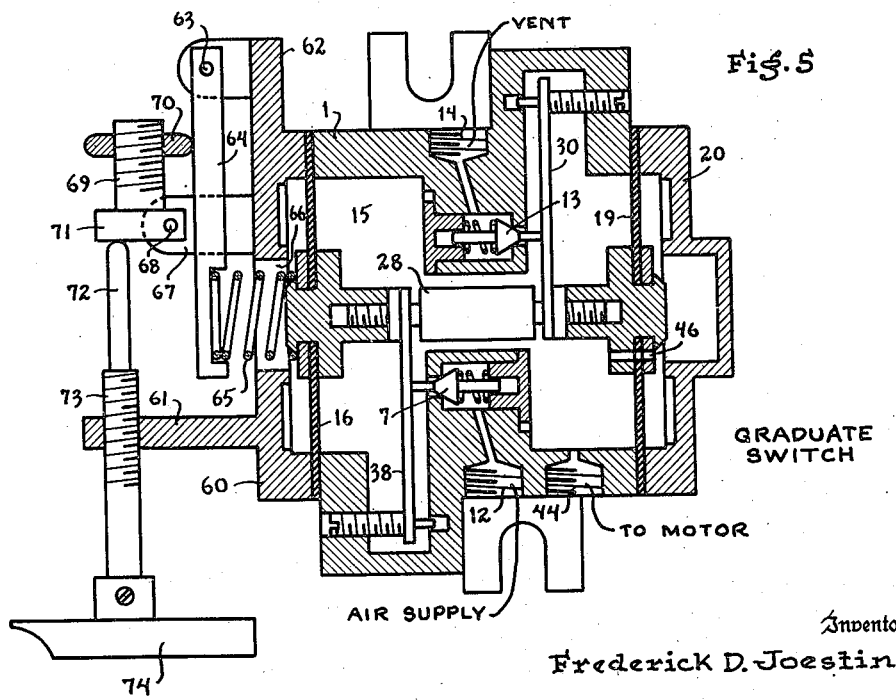

Patented June 16, 1942

2,286,282

UNITED STATES PATENT OFFICE 2,286,282

CONTROL APPARATUS

Frederick D. Joesting, Chicago, Ill., assignor to Minneapolis-Honeywell Regulator Company, Minneapolis, Minn., a corporation of Delaware Application July 3, 1939, Serial No. 282,635

7 Claims. (Cl. 121—46.5)

This invention relates to automatic controls and particularly to controls of the pressure actuated type which utilize a suitable medium such as air or liquid under pressure or vacuum as the controlling medium.

In this art, it is often necessary in order to obtain the desired sequence of operation of a control system to utilize various accessories. For example, in some situations where it is desirable to utilize a single thermostat for controlling two motors and to provide an additional controller for one of the motors which does not affect the other motor, it is necessary to control one of the motors through a relay. A device of this type is adapted to maintain a pressure in the branch line controlled by it equal to the pressure established by the thermostat or other controller, and is known as a direct acting relay. In other situations, it is necessary to cause the pressure applied to a motor being controlled to vary inversely with the pressure in a control line. Devices for performing this function are known in the art as reverse acting relays. Also, in this art, it is often necessary to provide a control device which operates in response to change in pressure in a control line for selectively connecting one control line with one or another line. It is also desirable in many installations to provide for manually controlling a motor from a control panel. This requires the use of an accessory known in the art as a graduate switch, which acts to maintain different pressures in its branch line in accordance with the position of an adjusting knob.

These various devices are required relatively infrequently and consequently the production of such accessories must be relatively small which causes the cost of production of such devices to be quite large. It is an object of this invention to reduce the production costs of equipment of this type by providing a valve arrangement which itself is simple in construction and which is adapted to form the main part of a large number of different control devices.

It is a further object of this invention to provide a pressure actuated valve assembly for a pneumatic controller which is sensitive in operation and which may be readily adjusted after the instrument is assembled.

More specifically, it is an object of this invention to provide a pressure actuated valve assembly consisting of a hollow base member which is closed at both ends by means of diaphragms, these diaphragms being connected together by a plunger which actuates suitable valve mechanism.

A further object is the provision of apparatus of this type which causes leakage or relief of pressure fluid only when the pressure controlled is actually being changed in value.

Other objects will appear from the following description and the appended claims.

For a full disclosure of this invention, reference is made to the following description and to the accompanying drawings in which:

Figure 1 is a sectional view of the invention as applied to a direct acting graduate relay;

Figure 2 is a detail of one of the valve levers of Figure 1;

Figure 3 shows a pressure controlled three-way or diverting valve embodying the invention;

Figure 4 is a sectional view of a reverse acting graduate relay, and

Figure 5 is a sectional view of the invention embodied in a graduate switch.

Referring to Figure 1 which shows a direct acting graduate relay, reference character 1 indicates a hollow base member having interior bosses 2 and 3 which are provided with valve bores 4 and 5. The valve bore 4 communicates with a valve port 6 having a valve member 7 cooperating therewith. This valve member 7 is provided with an extension 8 which extends through the valve bore and is also provided with a stem 9 which fits into a guide formed in plug 10 which covers the valve bore 4. A spring 11 is provided between the valve member 7 and the plug 10 for urging the valve 7 against its seat formed at the inlet of the valve bore. The valve bore 4 communicates with a passage 12 which extends outwardly through the boss 3 and which forms a connection for attaching an air supply pipe. The valve bore 5 contains a valve 13, the arrangement being the same as the air supply valve except that the valve 13 operates in the opposite direction to the valve 7. This valve bore 5 communicates with a passage 14 which extends to the exterior of the base member 1 and is formed to provide a pipe connection. In this case however, the passage 14 is not connected to any pipe but communicates directly with atmosphere.

The left-hand end of the chamber 15 which is formed within the base member 1 is covered by means of a diaphragm 16 which is held in place by a cap 17. This cap may be held in place by suitable screws (not shown) and is formed to provide a pipe connection 18 which is adapted to be connected to a pipe leading from the controller which may be a thermostat or other suitable device. The right-hand end of the chamber 15 is covered by means of a diaphragm 19 which is held in place by a cap 20 which is secured in place by suitable screws (not shown). Attached to the diaphragm 16 is a member 21, this member extending through the diaphragm and engaging a washer 22. A similar member 23 is attached to the diaphragm 19 in the same manner. The members 21 and 23 are provided with screw threaded openings 24 and 25 which receive the threaded stems 26 and 27 of a plunger 28. It will be apparent that this construction provides for supporting the plunger on the diaphragms 16 and 19 in a manner to permit free longitudinal movement of the plunger 28.

The plunger 28 is provided with a slot 29 which receives the valve lever 30. As shown in Figure 2, the lever 30 is formed with a slot 31 at its lower end for permitting the lever 30 to fit into the slot 29 of the plunger 28. This lever 30 extends upwardly into a chamber which is formed within a boss 32 extending laterally of the main portion of the base member 1. The boss 32 is provided with a threaded opening 33 which receives an adjusting screw 34 having a reduced portion 35 which extends through the opening 36 formed at the upper end of the lever 30. It will be apparent that upon movement of the plunger 28 to the left the upper end of lever 30 will be forced into engagement with the adjusting screw 34 and that this lever will pivot about the screw 34 and urge the valve member 13 away from its valve seat. By rotating the adjusting screw 33, the position of the pivot 34 of the valve lever 30 may be shifted thereby adjusting the valve member 13 relative to the plunger 28. The plunger 28 is also provided with a slot 37 which receives the upper end of a valve lever 38 which cooperates with the extension 8 of the valve member 6. This valve lever extends downwardly through the passage 39 and engages an adjusting screw 40 which may be rotated exteriorly of the base member 1 for thereby adjusting the position of the valve member 7 relative to the plunger 28.

When this relay is installed it is fastened to a suitable support by means of the lugs 42 and 43. The pipe connection 18 is connected to the thermostat or other controller, while the motor being controlled is connected to the pipe connection 44 which communicates with the chamber 15. Also an air supply pipe is connected to the passage 12. It will be noted that in this particular embodiment of the invention the chamber 15 communicates with the chamber 45 interior of the cap member 20 through a passage 46. Therefore, the pressure on one side of the diaphragm 19 is always equal to the pressure on the opposite side of this diaphragm and thus pressure on the diaphragm 19 has no effect upon the position of plunger 28.

In operation, assuming that the controller increases its branch line pressure which is applied to the left-hand side of diaphragm 16, this increase in pressure will force the diaphragm 16 and consequently the plunger 28 to the right. This will cause the valve lever 38 to urge the supply valve 7 away from its seat thereby admitting air under pressure from the passage 12 to the chamber 15 from which it flows through the pipe connection 44 to the motor being controlled. This flow of air will result in the pressure within chamber 15 increasing which will gradually return the diaphragm 16 and the plunger 28 to their original positions wherein the supply valve 7 engages its seat. This will occur when the pressure within the chamber 15 just balances the controlling pressure which is applied to the left-hand side of diaphragm 16. Conversely, if the controller decreases the pressure which is applied to the left-hand side of the diaphragm 16, the pressure on the right-hand side of this diaphragm will force this diaphragm and the plunger 28 to the left, thus causing the valve lever 30 to open the vent valve 13. This will lower the pressure in chamber 15 to a point wherein this pressure just balances the pressure applied to the left-hand side of diaphragm 16 at which time the plunger will return to its original position for closing the vent valve 13.

From the foregoing description it will be apparent that this invention provides a direct acting graduate relay for causing the pressure in the chamber 15 to always equal the pressure applied to the relay by its controller. It will also be apparent that by adjusting the screws 33 and 40 the supply and vent valves may be readily adjusted after the device is assembled for insuring the valves 7 and 13 will close simultaneously while at the same time reducing reversal losses to a minimum.

Referring to Figure 3 this figure shows the invention applied to a pressure actuated three-way or diverting valve. In this figure the construction is identical with that of Figure 1 excepting that the diaphragm 19 is not provided with a passage 46 as in Figure 1. Also, the cap member 20 is provided with a passage 48 which causes the pressure on the right-hand side of diaphragm 19 to always equal atmospheric. In this figure, a spring 49 is provided beneath the cap member 20 for thereby biasing the diaphragms 16 and 19 and the plunger 28 to the left. In this figure as in Figure 1, the controlling pressure is applied to the instrument through the pipe connection 18 upon the left-hand side of the diaphragm 16. The controlling pressure applied to diaphragm 16 therefore is opposed by the compression spring 49.

When the controlling pressure exceeds the force of spring 49, the plunger 28 will be pushed to the right thereby causing the valve lever 38 to urge the valve member 7 from its seat thereby placing the pipe connections 12 and 44 in communication. At this time the valve member 13 will remain seated thereby preventing the pipe connection 14 from communicating with the pipe connection 44. However, when the pressure applied by the controlling instrument is lowered to a point wherein it is overcome by the spring 49, this spring will urge the plunger 28 to the left thus closing the valve 7 and opening the valve 13. This will place the pipe connection 44 into communication with the pipe connection 14 instead of the pipe connection 12. It should be noted that in this embodiment of the invention, the pressure in chamber 15 has no influence on the position assumed by the diaphragm assembly, as it acts in opposite direction upon the diaphragms 16 and 19 which are equal in area.

This type of pressure actuated valve in which one pipe can be selectively connected to one or another pipe has many uses in pneumatic control systems as well known in the art.

Referring to Figure 4, this figure shows the invention applied to a graduate relay of the reverse acting type. The purpose of this relay is to reverse the action of a controller and thus cause the pressure controlled by the relay to decrease as the pressure applied to the relay is increased and vice versa. In this figure, the right-hand end of the base member 1 is provided with a special cap member 50 which is provided with a pipe connection 51. This cap member 50 is secured to the base member 1 and a washer 52 is located between the base member 1 and the diaphragm 19. The washer 52 is provided with an opening 53 which coincides with the recess 54 in the cap member 51. This arrangement provides for reducing the effective area of the diaphragm 19 so that this area is smaller than the area of the diaphragm 16.

The diaphragm 16 is covered by a special cap member 55, this cap member being provided with a central portion receiving a spring 56 and a threaded adjusting screw 57, having a vent passage 58 for causing atmospheric pressure to always exist on the left side of diaphragm 16.

As in the case of Figure 1, the passage 14 of this device opens to atmosphere while the passage 12 is connected to an air supply pipe and the passage 44 to the motor being controlled. In this device, the difference between the effective areas of the diaphragms 16 and 19 is equal to the effective area of the diaphragm 19. Thus a change in pressure applied to the right-hand side of diaphragm 19 will have the same effect upon the assembly formed of diaphragms 16 and 19 as an equal change in pressure within the chamber 15. It will be noted that the spring 56 urges the diaphragms and the plunger 28 to the right while pressure in chambers 15 and 54 urges the diaphragms and plunger in the opposite direction. In practice, assuming that the relay is applied to a system in which the pressure is varied from zero to 15 pounds per square inch, the spring 56 will be adjusted so as to balance a pressure of 15 pounds per square inch in chamber 15 when no pressure is present in the chamber 54.

Assuming that the controller for the relay increases the pressure applied to the chamber 54, this increased pressure will force the diaphragms and the plunger 28 to the left against the action of spring 56 thereby causing the valve lever 30 to open the vent valve 13. This will permit air to flow from the chamber 15 thereby reducing the pressure therein and when the pressure falls an amount equal to the increase in applied pressure caused by the controller, the spring 56 will once more just balance the combined pressures for causing the plunger 28 to assume its original position wherein the vent valve 13 is closed. If the controller for the relay reduces the pressure applied to the chamber 54, the combined force opposing the spring 56 will be overcome by this spring thereby urging the plunger 28 to the right causing the valve lever 38 to open the air supply valve 7 for increasing the pressure in chamber 15. As this pressure is increased the supply valve 7 is moved towards closed position and reaches this closed position when the increase in pressure within chamber 15 is equal to the decrease in applied pressure.

While it is desirable to provide an instrument in which the change in control pressure is equal but inverse to the change in the controlling pressure, in some cases it may be necessary to cause the controlled pressure to vary at either a greater or smaller rate than the controlling pressure and this may readily be done by merely changing the relative effective areas of the diaphragms 16 and 19. It will be apparent from the foregoing description that simply by providing the proper type of cover plates for the base member 1, the valve actuating mechanism is caused to provide a reverse graduate relay.

Referring to Figure 5, this figure shows the invention as applied to a graduate switch. The purpose of this device is to maintain any desired pressure in the line being controlled, this pressure being adjustable by a dial or knob upon a control panel. In this device, the base member 1 is provided with exactly the same type of cover plate 20 as shown in Figure 1 and the diaphragm 19 is provided with a passage 46 for thus equalizing the pressure on opposite sides of this diaphragm. The left-hand end of the base member 1 is provided with a special cap member 60. This cap member 60 is provided with integral brackets 61 and 62, the bracket 62 carrying the pivot 63 for a lever 64, this lever cooperating with a spring 65 which extends through an opening 66 in the cap member into engagement with the diaphragm 16. The cap member 60 is also provided with a bracket 67 to which is pivoted a bell-crank 68 having an arm 69 which extends longitudinally of the lever 64, this arm being screw-threaded for receiving a collar 70. The bell-crank 68 also includes an arm 71 which is engaged by a rod 72 which is attached to a threaded stem 73 which extends through the bracket 61 and carries a pointer or handle 74. It will be understood that this device is adapted for mounting at the rear of a control panel, the stem 73 extending through a suitable opening in the panel and the handle 74 being located at the front of the panel. It will be apparent that rotation of the stem 73 will cause rotation of the bell-crank 68 thus causing the collar 70 to actuate the lever 64 which engages the spring 65. Thus by rotating the pointer 74 the tension of spring 65 may readily be varied.

In operation, this device functions in the same manner as the graduate relay disclosed in Figure 1, the difference being that the force urging the diaphragm 16 towards the right is provided by the spring 65 instead of by air under pressure as in Figure 1. Thus at all times a pressure within the chamber 15 will be maintained which just exactly balances the force of spring 65. For example, if the force caused by the air pressure in chamber 15 is less than the force of spring 65, the spring will urge the plunger 28 to the right for opening the supply valve 7 thereby increasing the pressure in chamber 15 until the force of spring 65 is balanced. Conversely, if the pressure within chamber 15 overcomes the tension of spring 65, the plunger 28 will be moved to the left for opening the vent valve 13 thereby reducing the pressure within chamber 15 until it just corresponds to the tension of spring 65. Inasmuch as the pointer 74 provides for adjustment of the tension of spring 65, it follows that by adjusting the pointer 74 the pressure maintained by the device may be varied.

In a device of this type it is desirable to provide an adjustment for varying the change in pressure caused by a given rotation of pointer 74. This adjustment is readily accomplished by rotating the collar 70 thereby varying its position upon the arm 69 of the bell-crank 68. Thus by screwing the collar 70 downwardly, the lever 64 will rotate less for a given movement of bell-crank 58 and consequently the rotation of pointer 74 for a given change in pressure will be increased.

It should be noted that in all of the embodiments of the invention, the cap members act as stops for the diaphragm assembly and thus limit the movements of the various parts and prevent any damage thereto.

From the foregoing description it will be apparent that this invention provides a pressure actuated valve assembly which is simple in construction. It will also be apparent that due to the novel construction in which the valve actuating plunger is supported by diaphragms, frictional losses are cut to a minimum thereby obtaining a very sensitive device. Also due to the provision of the exterior valve adjustments, the instrument after assembly may be readily adjusted to insure that the valves do not overlap in action while at the same time reducing reversal losses to a minimum. It will also be apparent that this invention provides a novel pressure actuated valve assembly which forms the foundation for a number of different types of pneumatic control devices, the different devices being obtained simply by providing the proper end portions to the valve assembly.

While I have shown and described perferred forms of the invention, it will be understood that changes may be made without departing from the scope thereof. I therefore desire to be limited only by the scope of the appended claims.

I claim as my invention:

1. In a pneumatic control instrument, in combination, a base member, said base member having a chamber therein, a first diaphragm covering one end of said chamber, a second diaphragm covering the other end of said chamber, a plunger extending through said chamber, said plunger being carried by said diaphragms, a supply valve in said chamber, a vent valve in said chamber, said supply and vent valves communicating with said chamber, means actuated by said plunger for actuating said valves in sequence, means for equalizing the pressure on opposite sides of one of said diaphragms, and means for applying a variable controlling force to the other of said diaphragms, said last mentioned means comprising a spring abutting said diaphragm, a lever for loading said spring, an actuating member for positioning said lever, and motion varying means between said actuating member and said lever.

2. In a device of the character described, in combination, a base member, said base member having a chamber therein, a first diaphragm covering one end of said chamber, a second diaphragm covering the other end of said chamber, a plunger extending through said chamber, said plunger being connected at one end to said first diaphragm and being connected at its other end to said second diaphragm, a first valve port communicating with said chamber, a second valve port communicating with said chamber, said valve ports extending substantially parallel to said plunger, a first valve seat associated with the first valve port, a first valve member cooperating with said first valve seat, said first valve member being biased towards its seat and including an operating stem extending through its associated valve port into said chamber, a second valve seat associated with said second valve port, a second valve member cooperating with said second valve port and biased towards its seat, said second valve member also including an operating stem extending through its associated valve port into said chamber, said valve members extending in opposite directions, a first lever extending substantially normal to said plunger, said first lever having a pivot at one end and engaging said plunger at its other end, said first lever engaging the operating stem of the first valve member between its pivot and the plunger, a second lever extending substantially normal to said plunger, said second lever being pivoted at one end and engaging said plunger at its other end, said second lever engaging the operating stem of the second valve member between its pivot and said plunger, and adjusting means for one of said pivots, said adjusting means including an adjusting screw extending through the base member to the exterior thereof.

3. In a device of the character described, in combination, a base member, said base member having a chamber therein, a first diaphragm covering one end of said chamber, a second diaphragm covering the other end of said chamber, a plunger extending through said chamber, said plunger being connected at one end to said first diaphragm and being connected at its other end to said second diaphragm, a first valve port communicating with said chamber, a second valve port communicating with said chamber, said valve ports extending substantially parallel to said plunger, a first valve seat associated with the first valve port, a first valve member cooperating with said first valve seat, said first valve member being biased towards its seat and including an operating stem extending through its associated valve port into said chamber, a second valve seat associated with said second valve port, a second valve member cooperating with said second valve port and biased towards its seat, said second valve member also including an operating stem extending through its associated valve port into said chamber, said valve members extending in opposite directions, a first lever extending substantially normal to said plunger, said first lever having a pivot at one end and engaging said plunger at its other end, said first lever engaging the operating stem of the first valve member between its pivot and the plunger, a second lever extending substantially normal to said plunger, said second lever being pivoted at one end and engaging said plunger at its other end, said second lever engaging the operating stem of the second valve member between its pivot and said plunger, and adjusting means for each of said pivots, each adjusting means including an adjusting screw extending through the base member to the exterior thereof.

4. In a device of the character described, in combination, a base member, said base member having a chamber therein, a first diaphragm covering one end of said chamber, a second diaphragm covering the other end of said chamber, a plunger extending through said chamber, said plunger being connected at one end to said first diaphragm and being connected at its other end to said second diaphragm, a first valve port communicating with said chamber, a second valve port communicating with said chamber, said valve ports extending substantially parallel to said plunger, a first valve seat associated with the first valve port, a first valve member cooperating with said first valve seat, said first valve member being biased towards its seat and including an operating stem extending through its associated valve port into said chamber, a second valve seat associated with said second valve port, a second valve member cooperating with said second valve port and biased towards its seat, said second valve member also including an operating stem extending through its associated valve port into said chamber, said valve members extending in opposite directions, a first lever extending substantially normal to said plunger, said first lever having a pivot at one end and engaging said plunger at its other end, said first lever engaging the operating stem of the first valve member between its pivot and the plunger, a second lever extending substantially normal to said plunger, said second lever being pivoted at one end and engaging said plunger at its other end, said second lever engaging the operating stem of the second valve member between its pivot and said plunger, adjusting means for one of said pivots, said adjusting means including an adjusting screw extending through the base member to the exterior thereof, a first diaphragm cover for said first diaphragm, said first diaphragm cover including means adapted to apply a variable controlling force to the first diaphragm, and a second diaphragm cover for said second diaphragm.

5. In a device of the character described, in combination, a base member, said base member having a chamber therein, a first diaphragm covering one end of said chamber, a second diaphragm covering the other end of said chamber, a plunger extending through said chamber, said plunger being connected at one end to said first diaphragm and being connected at its other end to said second piaphragm, a first valve port communicating with said chamber, a second valve port communicating with said chamber, said valve ports extending substantially parallel to said plunger, a first valve seat associated with the first valve port, a first valve member cooperating with said first valve seat, said first valve member being biased towards its seat and including an operating stem extending through its associated valve port into said chamber, a second valve seat associated with said second valve port, a second valve member cooperating with said second valve port and biased towards its seat, said second valve member also including an operating stem extending through its associated valve port into said chamber, said valve members extending in opposite directions, a first lever extending substantially normal to said plunger, said first lever having a pivot at one end and engaging said plunger at its other end, said first lever engaging the operating stem of the first valve member between its pivot and the plunger, a second lever extending substantially normal to said plunger, said second lever being pivoted at one end and engaging said plunger at its other end, said second lever engaging the operating stem of the second valve member between its pivot and said plunger, adjusting means for one of said pivots, said adjusting means including an adjusting screw extending through the base member to the exterior thereof, a first diaphragm cover for said first diaphragm, said first diaphragm cover including means adapted to apply a variable controlling force to the first diaphragm, a second diaphragm cover for said second diaphragm, said second diaphragm cover being imperforate, and means for equalizing the pressures on opposite sides of said second diaphragm.

6. In a device of the character described, in combination, a base member, said base member having a chamber therein, a first diaphragm covering one end of said chamber, a second diaphragm covering the other end of said chamber, a plunger extending through said chamber, said plunger being connected at one end to said first diaphragm and being connected at its other end to said second diaphragm, a first valve port communicating with said chamber, a second valve port communicating with said chamber, said valve ports extending substantially parallel to said plunger, a first valve seat associated with the first valve port, a first valve member cooperating with said first valve seat, said first valve member being biased towards its seat and including an operating stem extending through its associated valve port into said chamber, a second valve seat associated with said second valve port, a second valve member cooperating with said second valve port and biased towards its seat, said second valve member also including an operating stem extending through its associated valve port into said chamber, said valve members extending in opposite directions, a first lever extending substantially normal to said plunger, said first lever having a pivot at one end and engaging said plunger at its other end, said first lever engaging the operating stem of the first valve member between its pivot and the plunger, a second lever extending substantially normal to said plunger, said second lever being pivoted at one end and engaging said plunger at its other end, said second lever engaging the operating stem of the second valve member between its pivot and said plunger, adjusting means for each of said pivots, each adjusting means including an adjusting screw extending through the base member to the exterior thereof, a first diaphragm cover for said first diaphragm, said first diaphragm cover including means adapted for supplying to said first diaphragm a variable controlling pressure, a second diaphragm cover for said second diaphragm, a biasing spring for said second diaphragm, one end of said spring being supported by said second diaphragm cover, said second diaphragm cover being formed for subjecting said second diaphragm to atmospheric pressure.

7. A reverse acting fluid pressure relay comprising a base member, said base member having a chamber therein, a first diaphragm of relatively small effective area covering one end of said chamber, a second diaphragm of relatively large effective area covering the other end of said chamber, a first diaphragm cover for said first diaphragm and constructed for applying a variable control pressure to said first diaphragm, a second diaphragm cover for said second diaphragm, a spring for biasing said second diaphragm towards said chamber, said second diaphragm cover being constructed for subjecting said second diaphragm to atmospheric pressure, a plunger extending through said chamber, said plunger being connected to said diaphragms, a supply valve in said chamber, a vent valve in said chamber, lever means actuated by said plunger for actuating said valves in sequence, said lever means acting upon movement of said plunger in response to increase in controlling pressure to open said vent valve and upon opposite movement to open said supply valve.

FREDERICK D. JOESTING.